3,327,943
PURE FLUID ANALOG COMPUTER
Gary L. Roffman, Washington, D.C., and Silas Katz, Silver Spring, Md., assignors to the United States of America as represented by the Secretary of the Army
Filed June 2, 1966, Ser. No. 554,896
10 Claims. (Cl. 235—200)

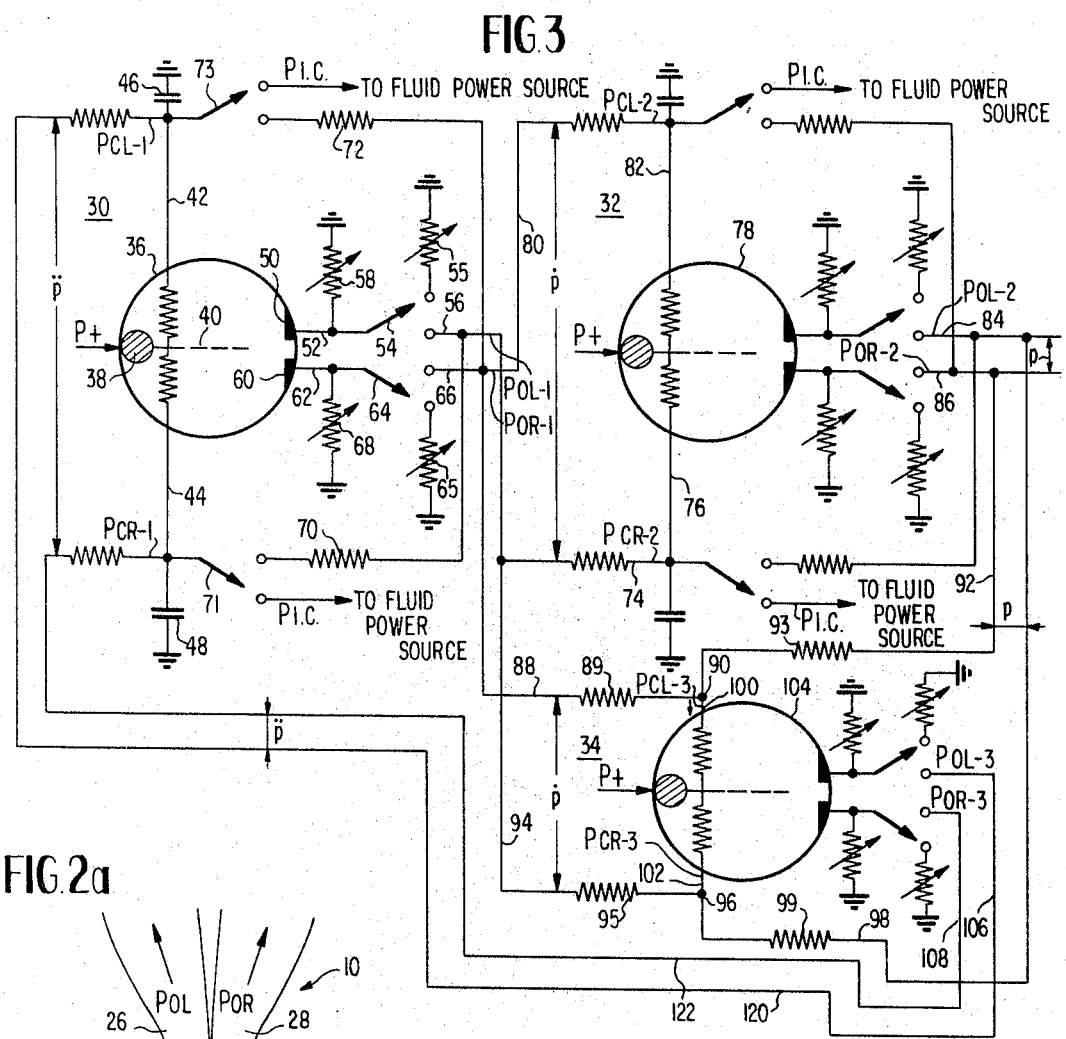

This invention relates generally to pure fluid analog computers and more particularly to a pure fluid analog computer for solving second order differential equations.

Since the development in 1959 of proportional pure fluid amplifiers, emphasis has been placed on optimizing the design of the amplifiers rather than designing pure fluid computing circuits or systems incorporating such amplifiers.

Therefore, it is the primary object of the invention to provide an improved pure fluid analog computer for the solution of second order differential equations.

Another object is to provide such a computer incorporating a pure fluid bootstrap integrator.

Another object is to provide such a computer wherein the integrator includes a pure fluid proportional amplifier of the jet deflection type.

Still another object of the invention is to provide such a fluid computer wherein the integrator includes a fluid resistance connected in a positive feedback path of the amplifier.

Another object is to provide such a computer having fluid pressure signal storage means coupled to the integrator for storing a pressure signal corresponding to an initial condition of a differential equation to be solved.

Another object is to provide such a computer having fluid switching means for simultaneously interrupting the feedback path and connecting the storage means to a source of pressure for establishing the initial condition.

Another object is to provide such a computer in which a variable resistor is connected to the output of the amplifier to permit adjustment of the amplifier gain.

A further object of the invention is to provide such a computer incorporating a pure fluid proportional amplifier of the differential or bi-directional type.

Briefly, the preferred embodiment of the invention comprises a pair of pure fluid integrators whose output pressure signals are applied to a pure fluid summer, whereby the solution to a second order differential equation is obtained. The output of the first integrator is applied to the input of the second integrator as well as to the input of the summer, whose output is applied to the input of the first integrator. The integrators include fluid capacitors for storing pressure signals corresponding to the initial conditions of each particular problem to be solved. Each integrator and the summer includes a proportional fluid amplifier.

These and other objects, features and advantages of the invention will become apparent from the following decription of a preferred embodiment thereof and the accompanying drawing, in which:

FIGURE 1a shows schematic or symbolic representations of a fluid resistance, such as a capillary tube;

FIGURE 1b shows schematic or symbolic representations of fluid capacitances, such as a tank;

FIGURE 2a is a pictorial representation of a jet deflection type proportional fluid amplifier incorporated in the preferred embodiment of the invention;

FIGURE 2b is a schematic or symbolic representation of the proportional fluid amplifier of FIGURE 2a; and FIGURE 3 is a schematic diagram of a preferred embodiment of an improved pure fluid analog computer for solving second order differential equations.

Before discussing the preferred embodiment of the pure fluid analog computer illustrated in FIGURE 3, let us first briefly consider the passive and active components of the computer.

For the performance of computation with fluid signals, the signal variable must be selected. There are two main considerations in choosing a signal variable. It must represent the state of the fluid and must be easy to measure. Whenever the density of the fluid remains approximately constant, these requirements lead to the selection of total pressure as the signal variable.

It is also necessary to have a way of describing the performance of the individual fluid components. For this purpose, the electrical analogy is useful. Total pressure $p$ is analogous to voltage, and volume flow Q is analogous to current. Thus, fluid resistance, fluid capacitance, and fluid inductance may be defined as follows:

Fluid resistance:

$$R = \frac{p}{Q}$$

Fluid capacitance:

$$C = \frac{Q_{in} - Q_{out}}{sp}$$

Fluid inertance:

$$L = \frac{p}{sQ}$$

where $s$ equals the differential operator $d/dt$.

The accuracy of analog computation, electrical or fluid, is obviously limited by the accuracy of the passive and active components used.

Only two types of passive fluid components are required for the improved fluid analog computer. One is a capillary tube fluid resistance whose symbols are illustrated in FIGURE 1a, and the other is a tank type fluid capacitance whose symbols are illustrated in FIGURE 1b. At the extremely low frequencies (below one cycle per second) of operation, inertive reactance is negligible in practical size components. In one actual reduction to practice of the preferred embodiment, using air as the fluid the components were connected to each other by fluid lines made from 5/32 inch I.D. tubing. The components may be separated by a valve if desired, since the resistance of such valves is at least one order of magnitude smaller than the capillary resistances. The capacitance of such valves is several orders of magnitude smaller than the tank capacitors used. In other words, the contribution of these connections to the values of the fluid impedances in the system is less than 5% of the total impedance.

Furthermore, the fluid resistances were formed from 3/16 inch diameter porcelain rods twelve inches long. The rods contain 25 holes 0.011 inch in diameter and extending the entire length of the rod. When the flow in such a capillary is laminar and fully developed, its resistance is practically linear, and the magnitude of the fluid resistance can be approximated by the Hagen-Poiseuille law $$R = \frac{\Delta p}{Q} = \frac{128 \mu l}{K D^4}$$

where:
$\mu$ = viscosity of the fluid—lb.f-sec/in.$^2$, N-sec/cm.$^2$
$l$ = length of resistor—in. cm.
$K$ = number of capillary holes
$D$ = internal diameter of one capillary hole—in. cm.

A wide variety of resistance values can be obtained by breaking the porcelain tubes into different lengths.

The fluid counterpart of the electrical blocking capacitor requires a moving part, such as a diaphragm. However, the preferred embodiment of FIGURE 3 utilizes a tank type capacitor which represents a capacitance to ground in the electrical sense. Such a capacitor requires no moving parts.

The active component of the improved analog computer is a jet deflection type proportional fluid amplifier illustrated pictorially in FIGURE 2a and schematically in FIGURE 2b. Basically, in such an amplifier, a control pressure difference signal deflects a power jet to produce a larger pressure difference signal across the output ports or orifices thereof. When the amplifier is operated in its linear range, the output difference signal is proportional to the control difference signal. Since the control jet signal is much smaller than the power jet signal, fluid signal amplification is realized. When the amplifier is properly adjusted, a zero difference control signal applied to the control ports or orifices of the amplifier results in a zero difference output signal.

A jet deflection type proportional fluid amplifier 10 is illustrated in FIGURE 2a. A fluid power source (not shown) applies a fluid pressure power signal P+ to an input port 12 terminating in an orifice or nozzle 14 which directs a power jet into a chamber 15. Vents 16 and 17 open chamber 15 to ambient pressure. A left pressure control signal $P_{CL}$ supplied to the left control port 18 terminating in a nozzle or orifice 20 directs a left control jet against the power jet. Similarly, a right pressure control signal $P_{CR}$ is applied to port 22 terminating in a nozzle or orifice 24 for applying a right control jet against the opposite side of the power jet. Left and right output ports or channels 26 and 28 communicate with chamber 16. and carry the left and right output fluid pressure signals $P_{OL}$ and $P_{OR}$, respectively.

When the control signals $P_{CL}$ and $P_{CR}$ are equal, the power jet is centered between the output ports 26 and 28 so that the jet is equally divided between the two output ports. Consequently, the differential pressure signal developed across output ports 26 and 28 is zero. However, if, for example, control signal $P_{CL}$ should increase relative to control signal $P_{CR}$, then a proportionately greater amount of the power jet will flow through the right output port 28 than through the left port 26, thereby developing across the output ports a differential pressure signal proportional to the difference in the control signals.

Since total pressure is selected as a signal variable, the transfer function relates the output total pressure difference $P_{OR}-P_{OL}$ to the control total pressure difference $P_{CL}-P_{CR}$. This relation is called pressure gain $G_p$ and for low frequency signals may be written as:

$$G_p = \frac{\Delta(P_{OR}-P_{OL})}{\Delta(P_{CL}-P_{CR})} = G_0 \left[ \frac{Z_L}{Z_L+R_o} \right]$$

where:

$G_0$=the pressure amplification factor (pressure gain with infinite load impedance)
$Z_L$=load impedance—lb. f-sec./in.$^5$, N-sec./cm.$^5$
$R_o$=output resistance of the amplifier—lb. f-sec./cm.$^5$, N-sec./cm.$^5$ It is obvious from this equation that a low output resistance amplifier is desirable. If this resistance can be made zero, the amplifier can be connected to any load without changing its gain. Practically, however, this cannot be attained. Thus, when using such an amplifier, the loads of the circuit must always be considered, but the gain for different output resistances can be easily determined by experimental tests.

In FIGURE 3, there is shown a schematic diagram of a preferred pure fluid analog computer for solving second order differential equations. The computer includes three basic components: two pure fluid bootstrap integrators 30 and 32 and a pure fluid summer 34.

Integrators 30 and 32 are identical. Looking at integrator 30, for example, we see that it contains as its active element a deflection type pure fluid amplifier 36. A fluid power source (not shown) applies a power pressure signal P+ to the amplifier input port 38 to produce a power jet 40. The left and right control ports are designated by the numerals 42 and 44 respectively. A tank capacitor 46 is connected to control port 42, and a tank capacitor 48 is connected to control port 44. Output port 50 is connected via a fluid line 52 and a switch 54 to a line 56. An adjustable vent fluid resistor 58 coupled to output line 52 provides for adjusting the gain of amplifier 36. In like manner, the right output port 60 is connected via an output line 62 and a switch 64 to another line 66. An adjustable resistor 68 is connected to output port 62. Furthermore, a capillary tube fluid resistor 70 and a fluid switch 71 are connected in series in a positive feedback path between output lines 56 and the right control port 44. Similarly, another capillary tube fluid resistance 72 and a fluid switch 73 are connected in series in a positive feedback path between output line 66 and control port 62.

Amplifier 36 is of the jet deflection differential type in which the difference in the control pressure signals $P_{CL-1}$ and $P_{CR-1}$ determines the proportions of the power jet flowing through the output ports 50 and 60 and thereby the amplified differential output signal appearing across ports 50 and 60. The fluid amplifier 36 in combination with the positive feedback fluid resistors 80 and 82 form the bootstrap pure fluid integrator 30.

The output differential signal is produced by two separate signals; the left output pressure signal $P_{OL-1}$ on line 56 and the right output signal on line 66. The output difference signal $P_{OL-1}-P_{OR-1}$ is applied as the differential control signal to the second integrator 32. Signal $P_{OL-1}$ is applied as control signal $P_{CR-2}$ via a line 74 to the right control port 76 of another jet type proportional fluid amplifier 78 which forms the active element of integrator 32. Similarly, output pressure signal $P_{OR-1}$ is applied as control signal $P_{CL-2}$ via a line 80 to the left control port 82 of amplifier 78. Integrator 32 functions in the same manner as integrator 30 to provide a differential output pressure signal formed by signals $P_{OL-2}$ on line 84 and $P_{OR-2}$ on line 86.

Signal $P_{OR-1}$ is also applied via a fluid line 88 and a fluid resistance 89 to a summing point 90, and fluid signal $P_{OR-2}$ is applied to the same poin via a line 92 and a fluid resistance 93. In like manner, pressure signal $P_{OL-1}$ is connected via line 94 and a fluid resistance 95 to a summing point 96 where it is mixed with the signal $P_{OL-2}$ flowing through line 98 and a fluid resistance 99. Fluid resistors connected to the summing points 90 and 96 form a summing network to produce control signals $P_{CL-3}$ and $P_{CR-3}$ applied to the input ports 100 and 102, respectively, of a constant gain summer amplifier 104. Amplifier 104 also is of the jet deflection pure fluid type identical to amplifiers 36 and 38. The output pressure signals $P_{OL-3}$ and $P_{OR-3}$ appearing on lines 106 and 108 are then applied as control signals $P_{CL-1}$ and $P_{CR-1}$ to input ports 42 and 44, respectively, of integrator 40.

It can be shown that the analog computer of FIGURE 3 solves the second order of linear differential equation:

$$\ddot{p} + a\dot{p} + bp = 0$$

where $$\ddot{p} = \frac{d^2p}{dt^2}, \quad \dot{p} = \frac{dp}{dt}$$

and $a$ and $b$ are constant coefficients. The equation has solutions in different forms depending upon the relative magnitude of the coefficients.

This equation may also be rewritten as:

$$\ddot{p} = -a\dot{p} - bp$$

Now, $\ddot{p}$, a pressure signal representing the second derivative of pressure with respect to time, is assumed to exist at a point. In the embodiment of FIGURE 3, $\ddot{p}$ is in the form of a differential pressure signal $P_{CL-1}-P_{CR-1}$. From this pressure signal, other pressure signals representing $a\dot{p}$ and $bp$ can be generated. The two bootstrap integrators 30 and 32 perform this function, and the signals $a\dot{p}$ and $bp$ are then summed in the summing amplifier 34, which includes the pairs of summing resistors 89, 93 and 95, 99.

In operation, initial conditions of the differential equation are first applied to the integrators 30 and 32 by storing pressure signals on their associated tank capacitors connected to their control ports. Since integrators 30 and 32 are identical, we will consider only integrator 30.

The positive feedback fluid resistor 72 is connected through a fluid switch or valve 73 to control port 42. In like manner, positive feedback fluid resistor 70 is connected through a fluid switch or valve 71 to control port 44. When the initial conditions are applied, the switches 73 and 71 are operated to interrupt their respective feedback paths and connect their respective tank capacitors 46 and 48 to a source of fluid pressure (not shown) to store a fluid pressure signal in the tank capacitors corresponding to the initial conditions of the equation being solved. Initial conditions are applied to integrator 32 in exactly the same manner. The stored initial condition pressure signal is designated $P_{ic}$. The difference between the signals stored in capacitors 46 and 48 represents the value of $\dot{p}$ when the problem is first started.

When the problem is initiated after initial conditions have been stored, switches 71 and 73 are closed to complete the positive feedback paths incorporating fluid resistors 70 and 72. The bleed resistors 58 and 68 are varied to adjust the gain of the amplifier. Furthermore, when initial conditions are being applied, fluid switches 54 and 64 connect the output ports 50 and 60 to the dummy load capillary tube fluid resistors 55 and 65, respectively, thereby preventing the amplifier output from disturbing the initial conditions of the other integrator 32. The dummy load resistors can be adjusted so that the initial condition pressure signal at the amplifier output is the same at $t(0^-)$ and $t(0^+)$. The output ports of integrator 32 and summer 34 are also connected to dummy loads as illustrated in the diagram of FIGURE 3.

To start the problem, after initial conditions haave been applied, the various switches are operated to complete all positive feedback paths and switch all output ports from the dummy loads to their output lines. If dummy loads were not used, there would be a time delay at the start of a problem while the output pressures were building up to their initial conditions. By using dummy loads that simulate circuit loads, the output differential pressure is set before the problem starts, that is, $p(0^+)=p(0^-)$ and $\dot{p}(0^+)=\dot{p}(0^-)$. The bleed resistors 58 and 68 are preset to give the desired pressure gain with the amplifier connected to the dummy loads and also serve to balance out asymmetries in the amplifiers. The bleed resistors remain in the fluid circuit during solution of the problem.

The improved pure fluid analog computer has successfully solved second order differential equations to provide undamped, damped and critically damped solutions. The solution $p$ may be obtained as a differential pressure signal $P_{OL-2}-P_{OR-2}$ across lines 84 and 86 on the output of the second integrator 32.

In summary, there has been described in detail, sufficient for persons skilled in the pertinent art to practice this invention, an improved pure fluid analog computer for solving second order differential equations. Proportional fluid amplifiers and passive fluid components have been placed in fluid circuits to perform the operations of integration and summing. The separate computational blocks thus formed have been interconnected in a novel manner to solve a second order differential equation.

While the invention has been particularly shown and described with reference to a preferred embodiment thereof, it will be understood by those skilled in the art that various changes in form and details may be made therein without departing from the spirit and scope of the invention.

What is claimed is:
1. A pure fluid analog computer for solving a second order differential equation comprising:
 (a) a first pure fluid integrator having input port means, control port means and output port means,
 (b) a second pure fluid integrator having input port means, control port means and output port means,
 (c) a pure fluid summer having input port means, control port means and output port means,
 (d) means intercoupling said output port means of said first integrator and said control port means of said second integrator,
 (e) means coupling said control port means of said summer to said output port means of said first and second integrators, and
 (f) means intercoupling said output port means of said summer and said control port means of said first integrator.
2. A pure fluid analog computer as defined in claim 1 further comprising fluid pressure signal storage means associated with said first and second fluid integrators for storing fluid pressure signals representing the initial conditions of a second order differential equation.
3. A pure fluid analog computer as defined in claim 2 wherein said storage means comprises a fluid capacitor means including tank means coupled to said control port means.
4. A pure fluid analog computer as defined in claim 2 wherein said first and second fluid integrators and said summer each comprises a proportional fluid amplifier of the jet deflection type.
5. A pure fluid analog computer as defined in claim 4 wherein said proportional fluid amplifier is of the differential type having one input port, two control ports and two outut ports.
6. A pure fluid analog computer as defined in claim 4 wherein said first and second fluid integrators each comprises fluid impedance means connected in a positive feedback path between said control and output port means thereof.
7. A pure fluid analog computer as defined in claim 6 wherein said fluid impedance means comprises a capillary tube.
8. A pure fluid analog computer as defined in claim 6 further comprising fluid switch means coupled between said storage means and said fluid impedance means for selectively interrupting the fluid flow path through said impedance means and connecting said storage means to a source of fluid pressure.
9. A pure fluid analog computer as defined in claim 8 further comprising:
 (a) dummy load means connected to said output port means of said first and second and said summer amplifiers, and
 (b) additional fluid switch means for selectively interrupting fluid flow among said amplifiers and connecting the output port means of each of said amplifiers to said dummy load means.
10. A pure fluid analog computer as defined in claim 4 further comprising selectively variable fluid resistance means coupled to each amplifier for adjusting the gain thereof.

References Cited

UNITED STATES PATENTS 3,155,825  11/1964  Boothe _____ 235—201
3,294,319  12/1966  Bjornsen et al. _____ 235—200

OTHER REFERENCES

Roffman et al.: "15. Experimental Fluid Analog Computation," TR-1292, U.S. Army Materiel Command, Harry Diamond Laboratories, Washington, D.C., June 10, 1965.

RICHARD B. WILKINSON, *Primary Examiner.*

L. R. FRANKLIN, *Assistant Examiner.*